United States Patent
Stewart et al.

(10) Patent No.: US 6,498,311 B1
(45) Date of Patent: Dec. 24, 2002

(54) MULTI-LAYER KEYS WITH TRANSLUCENT OUTER LAYER

(75) Inventors: James R. Stewart, Woodinville; Hok-Sum Horace Luke, Mercer Island; Dick C. K. Liu, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/895,422

(22) Filed: Jun. 29, 2001

(51) Int. Cl.$^7$ .................................................. H01H 9/00
(52) U.S. Cl. ...................................... 200/313; 200/314
(58) Field of Search ................................ 200/5 R, 5 A, 200/517, 520, 308, 310, 313, 314, 341, 345; 339/433; 400/490, 494

(56) References Cited

U.S. PATENT DOCUMENTS

| | | | |
|---|---|---|---|
| 4,460,534 A | 7/1984 | Boehm et al. | 264/246 |
| 4,500,218 A | 2/1985 | Nishikawa | 400/490 |
| 5,120,920 A | 6/1992 | Moriike | 200/341 |
| 5,172,805 A | 12/1992 | Gumb | 200/341 |
| 5,172,990 A | 12/1992 | Weng | 400/490 |
| 5,280,145 A | 1/1994 | Mosier et al. | 200/313 |
| 5,399,821 A | 3/1995 | Inagaki et al. | 200/341 |
| 5,404,133 A * | 4/1995 | Moriike et al. | 340/815.56 |
| 5,635,927 A | 6/1997 | Lin | 341/22 |
| 5,718,326 A | 2/1998 | Larose et al. | 200/314 |
| 5,865,302 A * | 2/1999 | Suzuki et al. | 200/315 |
| 5,878,870 A * | 3/1999 | Ohtaki | 200/314 |
| 5,993,019 A * | 11/1999 | Kline et al. | 362/29 |
| 6,084,190 A | 7/2000 | Kenmochi | 200/341 |
| 6,103,346 A | 8/2000 | Nakajo et al. | 428/172 |
| 6,153,843 A * | 11/2000 | Date et al. | 200/339 |

FOREIGN PATENT DOCUMENTS

JP    5-62560    3/1993 .......... H01H/13/02

OTHER PUBLICATIONS

"Key Button Manufacture, " IBM Technical Disclosure Bulletin, vol. 12, No. 9, Feb. 1970, p. 1390.

* cited by examiner

Primary Examiner—Michael Friedhofer
(74) Attorney, Agent, or Firm—Banner & Witcoff, Ltd.

(57) ABSTRACT

A highly legible key that is durable and suitable for electronic devices, including gaming consoles and controllers. The key includes an outer layer and an inner layer and may be formed by a two-shot injection molding process. The outer layer has a cavity delineating a negative form of a desired indicia or indicium. The inner layer is located interior to the outer layer filling the negative form with the desired indicium. The outer layer is formed of transparent or translucent material and the inner layer is formed of an opaque or darker material, such that, the indicium is visible through the outer layer material. The outer layer can be tinted. The outer layer protects and magnifies the indicium of the inner layer. The inner layer in the region of the indicium can be domed for increased visibility. The outer layer can have a dome surface, which is on a slope for improved finger-to-button contact. The outer layer can have a step and a tab for retaining the button in an electronic device housing.

35 Claims, 5 Drawing Sheets

FIRST SHOT

SECOND SHOT

MULTI-LAYER KEYS WITH TRANSLUCENT OUTER LAYER

FIELD OF THE INVENTION

The present invention relates to key switches, and more particularly to a key switch having a key or pushbutton made from an outer layer and an inner layer where the inner layer bears some indicium and the outer layer protects and magnifies the indicium. The invention further relates to a game controller incorporating the inventive key or pushbutton.

BACKGROUND OF THE INVENTION

A variety of electric and electronic devices use keyboards, key pads, or pushbuttons. For example, a personal computer may have a keyboard, a mobile or cellular telephone may have a key pad, a public telephone may have a key pad or series of pushbuttons, and an electronic game controller may have pushbuttons. In each of these electronic devices, keyboards, key pads, and pushbutton assemblies, a key is depressed to activate a switch.

A key generally has indicia or indicium to indicate the function of the key. The indicia or indicium (hereafter, "indicium") can be letters, numbers, symbols, words or other indication of the assigned function to the key. The indicium can be painted on a top surface of the key so that a user can determine the function of the key. The problem with painted keys is that the indicium paint can wear-off leaving the user without means to readily determine the function of the key. This problem is particularly prevalent in applications subject to highly repetitive use and/or heavy duty use. One example, of a highly repetitive use application is a public telephone in a popular area where the telephone is subject to frequent use. Public telephones can also be subject to heavy duty use, including abuse, as well as, being subject to outdoor environmental elements. In these instances, paint on the keys indicating each of the key's numerical value can and often does wear off. An example of both high use and heavy duty use, is a game controller device where the use is highly repetitive, and the use is increasingly hard with escalating enthusiasm for the game.

To avoid the problem of the indicium paint wearing-off, manufacturers have made keys from different colored materials. In this instance, one material protrudes through a second material at the point of the indicium. The second material has through-openings delineating some indicium, and the first material fully protrudes into these through-openings. For example, FIG. 3B of U.S. Pat. No. 5,172,990 to Weng, shows a push-button 5 having a face plate 55 and bottom portion 56 where face plate 55 has holes conforming to the shape of letters or Arabic numerals 561. Weng represents that letters or numerals of this type of push-button key will not become obscured or blurred after a prolonged usage of the key (col. 3, lines 18–29). A drawback of the key of Weng is that the indicium is exposed to the surface. While the exposed indicium may not rub-off like paint, the indicium may still become fouled, particularly around a periphery of the indicium where the two materials meet. Over time the juncture between materials may enlarge due to wear and relative movement between the face plate and bottom portion creating a crevasse for contaminants. Furthermore, the exposed indicium may be difficult to discern due to the seemingly small size of the indicium.

In small electronic devices, hand-held devices, and devices that have a large number of keys arranged closely together, small size indicia are particularly problematic. U.S. Pat. No. 5,635,927 to Lin discloses an illuminated key cap having a plano-convex lens for showing a key identification pattern in an enlarged scale. A bottom wall II of the plano-convex lens is covered with a light blocking ink. This light blocking ink is laser engraved to define a non-ink pattern 12 in which light is allowed to pass. Viewed from the top, the convex wall outer surface of the key cap is said to cause the pattern 12 to be viewed in an enlarged scale (col. 3, lines 23–27). The problem is that this key cap is difficult to manufacture because the key cap is made from at least two separately produced parts. One of the parts is subject to the steps of photo-resist inking and laser engraving. That part must then be bonded together with the second part, sandwiching the remaining portions of the photo-resist layer at the interface. It appears that this mix-match of materials at the interface of the two separately produced parts could lead to separation of the parts over time. Accordingly, a key that overcomes the problems and disadvantages of the prior art is needed.

SUMMARY OF THE INVENTION

It is an aspect of the present invention to provide a highly legible key. Keys that have top quality visible characteristics are highly desirable in performance and precision applications.

It is another aspect of the present invention to provide a highly durable key. A key that maintains the functional and aesthetic qualities throughout the life of an electronic device in which the key is employed is needed.

It is yet another aspect of the present invention to provide a key that maintains legibility of the indicium and maintains its aesthetic qualities throughout highly repetitive and heavy duty use. A key that maintains its indicium and aesthetic qualities is very desirable in the console or controller gaming industry.

It is a further aspect of the present invention to simplify the manufacturing steps for making a key. Still further, it is an object to eliminate manual assembly steps for making a key and provide a key suitable for high volume production, and thus, reduce the manufacturing costs associated with making keys.

According to another aspect of the present invention, there is provided a key comprising an outer layer and an inner layer. The outer layer and the inner layer may be an outer shell and an inner core, respectively. The outer layer is formed such that an inner surface of the outer layer has a recess delineating a negative form of the desired indicium. The inner layer is formed to the interior of the outer layer and fills the negative form of the desired indicium. The outer layer is formed of transparent or translucent material such that the material of the inner layer is visible through the outer layer. In this manner, the outer layer protects the indicium from wear and from fouling. The outer layer can be tinted to improve key identification and discrimination such as by color recognition. The key can also be tinted to add to the aesthetic appearance of the key and of the electronic device in which the key is employed.

Accordingly to another aspect of the present invention, the inner layer of the key is formed of a material such that the indicium is readily discernable through the outer layer. In this manner, the material may be opaque or tinted, and the color selected for aesthetic appearance of the key, and for color complement or contrast with the outer layer and surrounding electronic device casing.

According to another aspect of the present invention, the outer surface of the inner layer may be curved or domed in the region of the indicium. This curve or dome in the region of the indicium allows the key indicium to be easily viewed from the side of the key, as well as, directly overhead.

According to yet another aspect of the present invention, an outer layer with a domed exterior surface may be further desirable in that the dome can impart a level of magnification to the indicium located below the domed exterior surface.

According to still another aspect of the present invention, the outer layer has a tip portion axially aligned with a base portion. A step or a ledge can be created at the juncture of these two portions that is useful for retaining the key within an opening in an electronic device casing. The tip portion may be elliptical or oval shaped and the base portion may be cylindrically shaped.

According to another aspect of the present invention, the dome exterior surface of the outer layer is positioned along a sloping line. Positioning the dome along a slope improves finger-to-button contact by creating a larger dome surface area ensuring that a user engages the key when the user's fingers are moving generally horizontally across a surface of an electronic device casing.

According to still another aspect of the present invention, the key may be formed from the same type of polymer though of different colors or transparencies. The key may be formed by a two-shot molding sequence where a first mold is provided to form the outer layer and then a second mold is provided to form the inner layer. The outer layer is used to form an outer part of the second mold.

Further, the key may include a tab for retaining the key in an electronic device casing. The tab and the step or ledge are for engaging a structure of an electronic device casing, such that, the key can not misalign and dislodge from the electronic device.

According to another aspect of the present invention, the key includes an inner layer having a web. The web can be used for depressing a flexible contact switching assembly. The web may be recessed in the outer layer for centering the contact switching assembly with the key.

Other aspects and features of the invention will be more fully understood from the following detailed description and appended claims when taken with the accompanying drawings.

BRIEF DESCRIPTION OF THE DRAWINGS

The above and other objects and the nature and advantages of the present invention will become apparent from the following detailed description of an embodiment taken in conjunction with drawings, wherein.

DETAILED DESCRIPTION OF THE PREFERRED EMBODIMENTS

A key or pushbutton is described herein that is functionally durable and highly legible throughout the life of the device in which the key is used. The key is designed to have a readily recognizable indicium and have a visual impact with characteristics of precision and performance. The key is constructed with an inner layer having an indicium and that is completely contained within an outer layer in the region of the indicium in a manner that enables the key to be manufactured cost-effectively and in high volumes, while improving legibility and identification.

Referring now to FIGS. 1–6, a key or pushbutton in accordance with the present invention is generally designated as 100. Key 100 is generally used for key switches, and more particularly for electronic key switches in electronic devices. The key or pushbutton of the present invention is described in connection with electronic gaming controllers, but may be used for any suitable device.

Figure 1:
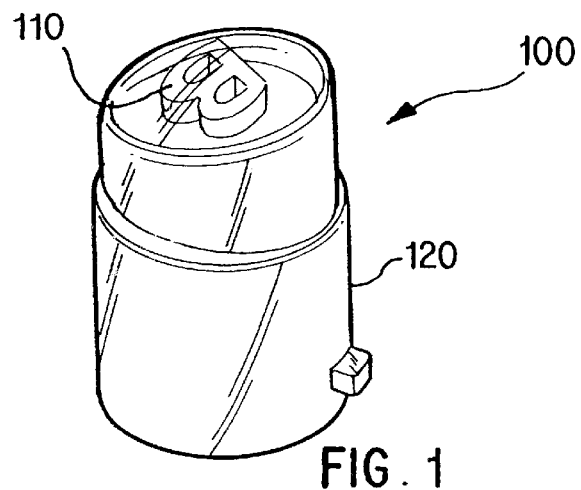
FIG. 1 is an isometric view of the key of the present invention.

Referring to FIG. 1, a key 100 is shown. Key 100 has an outer layer 120. An indicium 110 is visible through outer layer 120.

Figure 2:
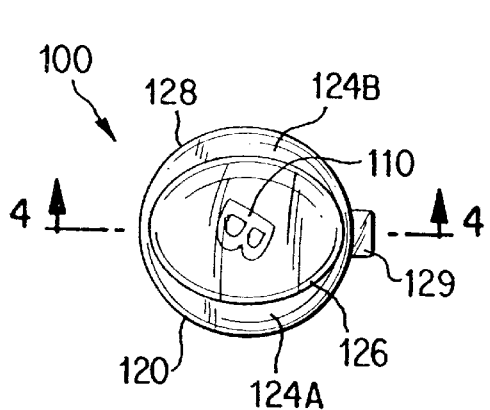
FIG. 2 is a top plan view of the key.
Figure 3:
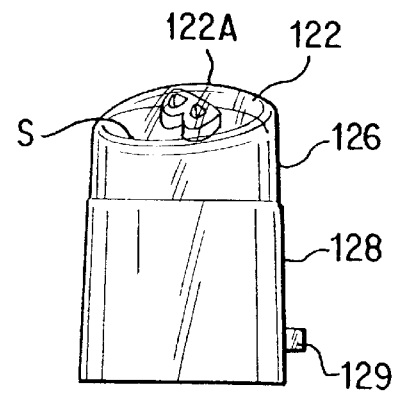
FIG. 3 is a side view of the key.

Referring to FIGS. 2–6, key 100 of the first embodiment will be described in detail. FIG. 2 shows a top view of key 100. Key 100 includes an outer layer 120 and an inner layer 130. Outer layer 120 is comprised of a base portion 128 and a tip portion 126 forming an outer shell. The base portion of the key is retained within an electronic device casing and the tip portion protrudes from an opening in the casing for engagement by the user. Base portion 128 can taper slightly outward from the tip portion to an opposing end of the base portion for facilitating mold removal. The base portion can further include at least one tab 129 for retaining, aligning or guiding the key within an electronic device casing. The base portion may be generally cylindrically shaped and tapering and the tip portion may be a generally oval or elliptically shaped, and in axial alignment with the base portion. Tip portion 126 and base portion 128 may be connected so as to create a ledge, such as at step portion 124A and at opposing step portion 124B. Outer layer 120 further includes a top portion 122 on tip portion 126.

Top portion 122 of the outer layer has a top surface 122a and a bottom surface 122b. Top surface 122a is domed for magnifying an underlying indicium. Top surface 122a can connect to tip portion 126 along a sloped line S. In one embodiment, the sloped line S extends parallel to a long axis of the generally oval or elliptically shape. Forming the dome along this angled, truncated section of tip portion 126 creates a greater dome surface area towards one side of the key for improved finger-to-button contact and ensuring that a user of the electronic device engages the key.

Figure 6:
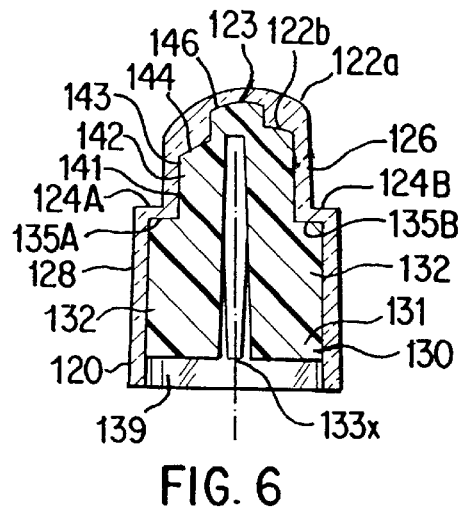
FIG. 6 is a cross-sectional side view taken along sectional line 6—6 in FIG. 5.
Figure 7:
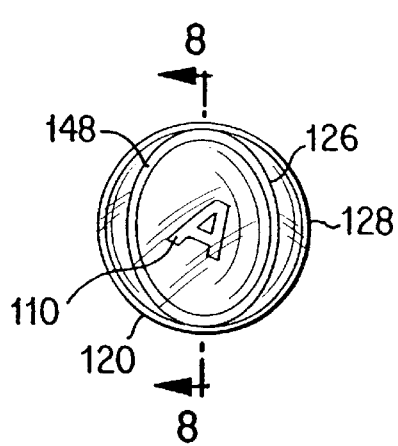
FIG. 7 is a top plan view of a key of an alternative embodiment.
Figure 8:
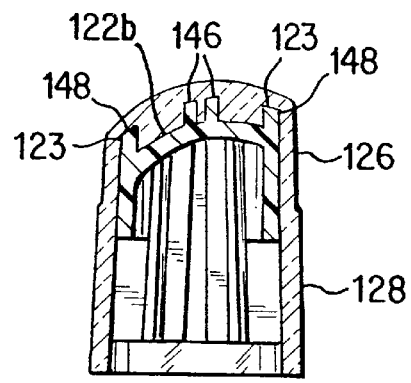
FIG. 8 is a cross-sectional side view taken along sectional line 8—8 in FIG. 7.
Figure 9:
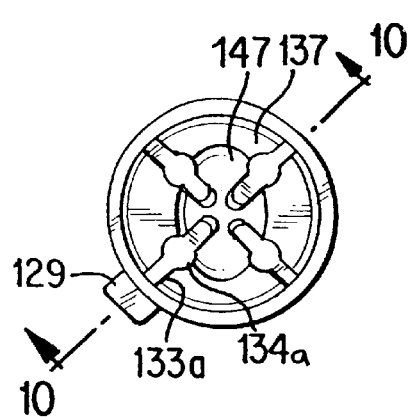
FIG. 9 is a bottom plan view of the key of FIG. 7.
Figure 10:
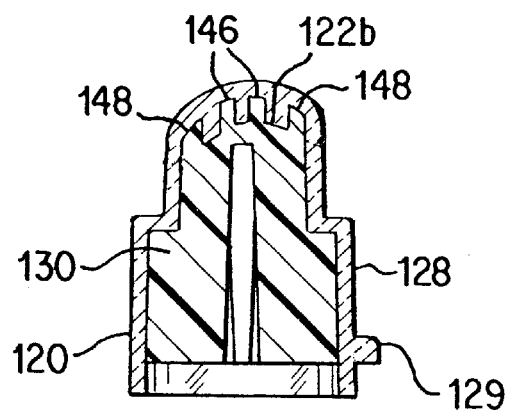
FIG. 10 is a cross-sectional side view taken along sectional line 10—10 in FIG. 9.

As best shown in FIG. 6, inner layer 130 is positioned in outer layer 120 and may generally define an inner core. Inner layer 130 comprises a first section 131 located in base portion 128, and second section 141 located in tip portion 126. First section 131 generally includes webs for engaging an electronic contact switch. More specifically, the first section includes a web section 132. Web section 132 includes webs 133a, 133b, 133c, and 133d, which are generally planar and rectangular (see FIG. 5). The webs may include a portion 134(a–d) that is of increased thickness for imparting strength to the webs. Increased thickness portions 134(a–d) are shown has elongate cylindrical portions traveling the length of the respective, otherwise rectangular webs 133(a–d)(see FIGS. 4–5). If desired a void 133x may be included between opposing webs and a hollow portion 137 may be included in regions intermittent the webs First section 131 further includes a flange that engages the step between the tip portion and the base portion of the outer layer. The flange can comprise two flanges 135A and 135B. The two flanges generally coincide with outer layer step portions 124A and 124B, respectively.

Second section 141 of inner layer 130 extends into the outer layer is tip portion 126. Second section 141 can include a pedestal 142 that may be oval shaped. The pedestal is defined by a wall 143, and a dome portion. The dome portion includes a dome surface 144. Extending from dome surface 144 is at least one protrusion 146 that generally forms an indicium (or indicia) indicating the function of the key. Interior to the pedestal is a hollow portion 147, see FIG. 5. Hollow portion 147 can be in communication with hollow portion 137.

Indicium 110 comprises the at least one protrusion 146 extending from dome surface 144 of oval pedestal 142. The outer layer's top portion 122 has a bottom surface 122b. Bottom surface 122b has at least one recess 123 for receipt of the at least one protrusion 146. A recess is defined as a depression or hollowed out space having a bottom surface and a sidewall surface forming a periphery of the recess. The periphery of the at least one recess 123 corresponds to the periphery of at least one protrusion 146 preferably in contiguous manner forming an airless interface. The indicium (or indicia) can be letters, numbers, symbols, words, or other indication of an assigned function to the key.

The arch of dome surface 144 allows the indicium to be viewed from a side of the key, as well as, from directly in line with a central axis of the key. Further, top surface 122a, which is domed, tends to magnify the indicium making the indicium larger and easier to view.

Figure 4:
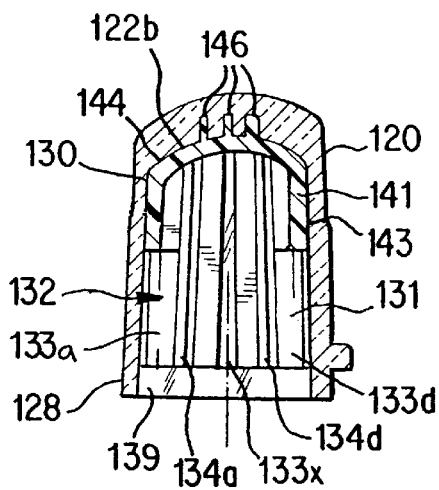
FIG. 4 is a cross-sectional side view taken along sectional line 4—4 in FIG. 1.
Figure 5:
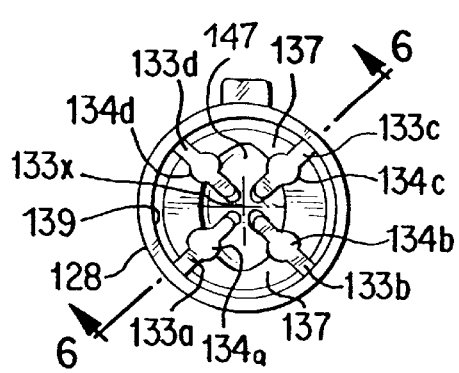
FIG. 5 is a bottom plan view of the key of FIG. 2.

FIGS. 4 and 6 show a cavity 139, which is defined by inner layer 130 and outer layer 120. Here, base portion 128 extends beyond inner layer 130 defining cavity 139 generally opposite top surface 122a.

Figure 11:
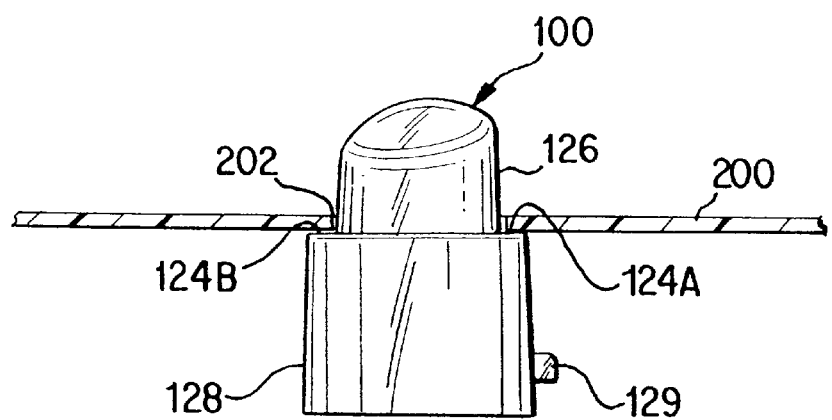
FIG. 11 is a side view of the key in a casing.

FIG. 11 shows key 100 at least partially disposed in and protruding from a casing 200. Casing 200 is also referred to as a housing. Casing 200 includes an opening 202. Opening 202 can be generally oval or elliptical shaped, or otherwise corresponding to the shape of tip portion 126. Key 100 is retained in casing 200 by step portions 124A and 124B. In a first position, the step portions abut a peripheral region of opening 202. The key is depressed to a second position where step portions 124A and 124B are spaced from casing 200 and an electronic contact switch is activated (second position not shown). In this embodiment, the key is permitted to travel generally axially with respect to opening 202. Tab 129 on the outer layer can also be used to retain the key within casing 200 by engaging an internal structure or some other structure of an electronic device (not shown). It will be appreciated that the outer layer may be smooth rather than stepped, or may have tabs or a concentric lip in place of a step, or may be made of two (or more) portions of different shapes and sizes as shown. Further, the two portions need not be axially aligned.

Figure 12A:
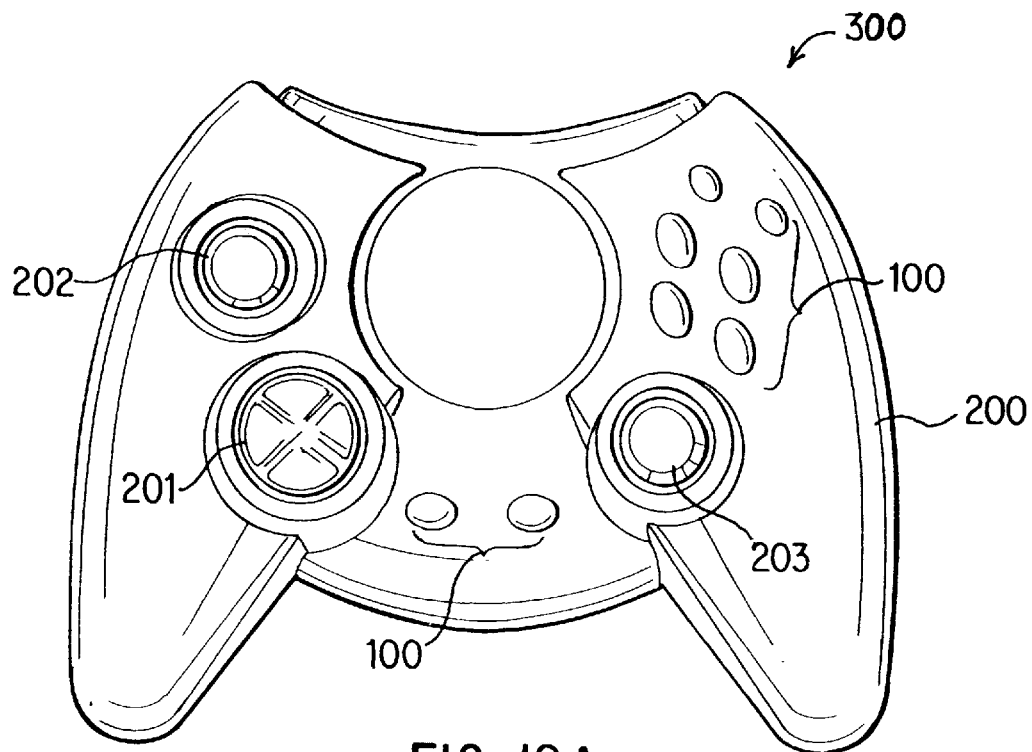
FIG. 12A is a plan view of a plurality of keys of the present invention in an electronic device.
Figure 12B:
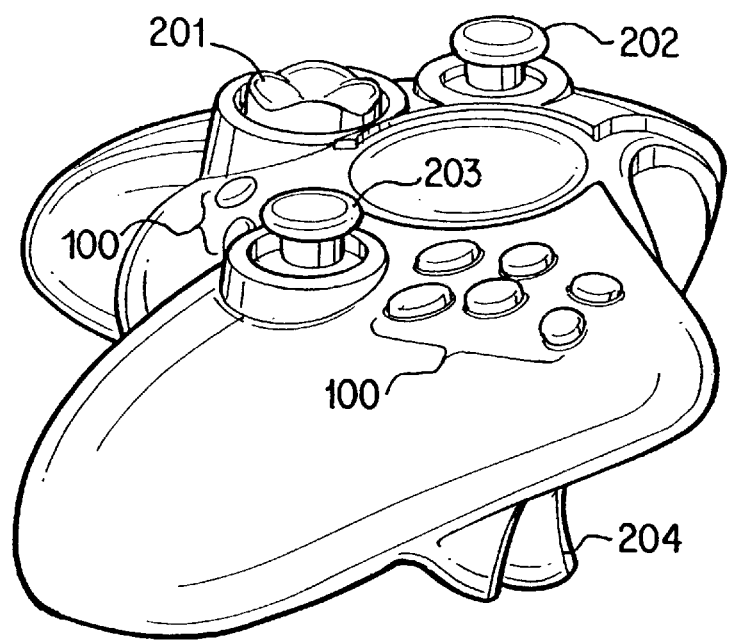
FIG. 12B is a perspective view of the electronic device of FIG. 12A.

Casing 200 is preferably an electronic device casing, and more preferably a casing for a game controller 300, such as a video game controller shown in FIG. 12A and FIG. 12B. Game controller 300 generally includes a plurality of keys 100 as previously described and shown. The keys can be of various sizes. Game controller 300 can include other types of pushbuttons, levers, joysticks, triggers and/or other controls associated with gaming. For example, FIGS. 12A and 12B show pushbutton 201, joysticks 202 and 203, and trigger 204.

In operation, key 100 is depressed to activate a switch. Preferably, but not necessarily, the switch is an electronic switch. In one arrangement, the switch can be comprised of electrical contacts and an elastic membrane member or diaphragm member, such that, when the member is compressed the contacts come together into electrical contact. The member can be centered within cavity 139. Cavity 139 can function to retain the electronic switch in connection with key 100. Web section 132 adjacent cavity 139 can engage the electronic switch, elastic membrane, or diaphragm member. The inner sidewall of base portion 128 surrounding cavity 139 can help to center the electronic switch or member with key 100.

FIGS. 12A and 12B show key 100 in use with game controller 300. In this embodiment, tip portion 126 protrudes from casing 200. As mentioned above, tip portion 126 has a top surface 122a, which can be both domed and sloped. The function of the dome placed on a slope is to ensure finger-to-button contact. For example, when controller 300 shown in FIGS. 12A and 12B is in use, a person would grasp lateral side portions of the controller and operate the various buttons on the top of the controller with their thumbs keeping their index finger or middle finger on trigger 202. As a person's thumb traverses the top surface of the controller in a rapid and largely horizontal motion, the sloped key tops aid in preventing the thumb from flying over the top of the key. The keys can be oriented or positioned in any manner relative to the controller to achieve the desired effect, and while all of the keys of controller 300 may be in accordance with the invention, they need not be.

Figure 13A:
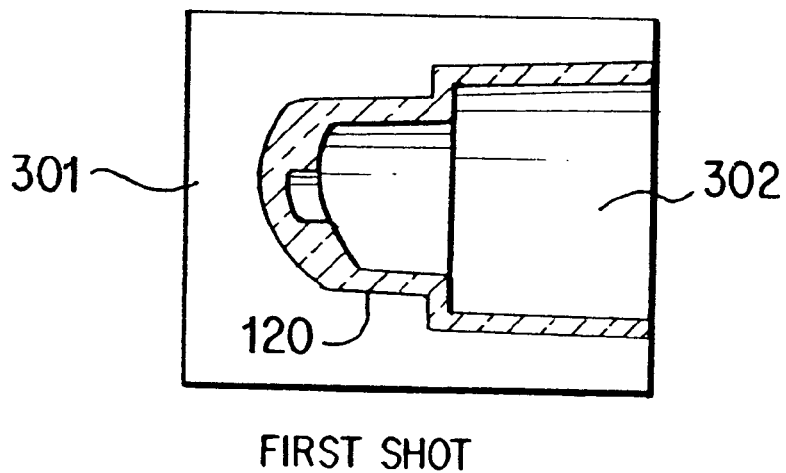
FIG. 13A is a schematic cross-sectional side view of an outer layer formed in a first mold.
Figure 13B:
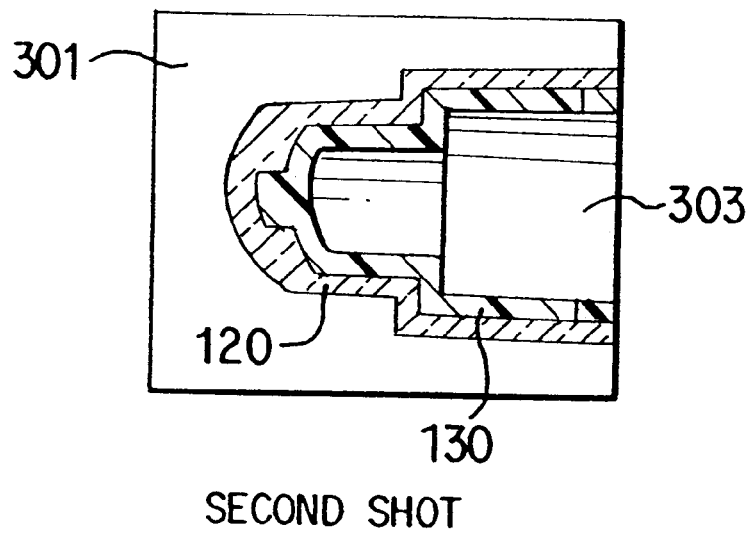
FIG. 13B is a schematic cross-sectional side view of the inner layer formed in a second mold, which includes the inside surface of the outer layer.

FIGS. 13A and 13B schematically illustrate a method of making key 100 of the present invention. A multiple-shot molding technique is employed, which is preferably two-shot injection molding. The first shot forms outer layer 120. Specifically, a first mold form 301 is provided defining an exterior surface of outer layer 120 and a second mold form 302 is inserted in first mold form 301 defining the interior surface of the outer layer 120. Liquid injection mold material is then injected into the resultant cavity. Second mold form 302 is retracted from interior the newly formed outer layer 120. A third mold form 303 is inserted into the newly formed outer layer and then a second liquid injection mold material is injected into the resultant cavity. In this manner, the outer layer functions an outer mold form for molding inner layer 130. As will be appreciated, the inner layer could be formed first and the inner layer could function as an inside mold form when molding the outer layer. It will also be appreciated that additional layers may be formed by additional like molding steps (e.g., triple-shot molding). Alternatively, layers may be stamped or otherwise formed from softened materials that harden in such a manner that one of the layers forms a mold form for the next layer.

One benefit of two-shot type molding is elimination of an outer mold for forming the inner layer. The elimination of an outer mold for forming the inner layer is also an elimination of a second mold for the indicium because the inner layer mold material fills the recess in the outer layer, the recess being a negative form of the desired indicium. Another benefit, is the elimination of a separate assembly step of the inner and outer layer. Because the indicium protrusion on the inner layer mates with the outer layer recess upon molding, no further assembly or alignment is required. Further, no adhesive is required since there is no manual assembly step. Inter-molecular forces and geometry are sufficient to retain the inner layer inside of the outer layer.

In one embodiment, the outer layer and the inner layer are formed of substantially similar materials. For example, the outer layer and the inner layer are formed of acrylonitrile-butadiene-styrene ("ABS"); ABS being a tough rigid plastic suitable for highly repetitive use and heavy duty use. When the molding materials are the same or substantially similar, cohesive inter-molecular attraction occurs serving to hold the inner layer inside the outer layer.

Outer layer 120 can include an opening (not shown) for venting and releasing gas during molding of the inner layer. The opening can also serve as a geometrical lock for connecting the outer layer and inner layer when the inner layer material lodges in the outer layer opening. As mentioned, base portion 128 can be tapered from tip portion 126 outward to an opposing end of the base portion for facilitating mold release.

The outer layer is formed of a transparent or translucent material. The outer layer material can be tinted with any desired color. A tinted outer layer adds to the aesthetic appearance of the key and to the electronic device in which the key is situated. The outer layer is formed of material such that the material of the inner layer is visible through a layer of the outer layer material.

The inner layer is formed of material that will be visible through the outer layer. Thus, the inner layer can be formed of a darker material than the outer layer. For example, the inner layer can be an opaque and the outer layer can be merely tinted with a color. For example, the inner layer could be opaque green and the outer layer clear. Further, the inner layer could be colored, either opaque or tinted, and the outer layer tinted some color. Or, the inner layer could be opaque white and the outer shell tinted some color, such as red or yellow. It will be appreciated that other variations are contemplated.

FIGS. 7–10 show an alternative embodiment; the reference numerals remain the same for like structure. In this embodiment, inner layer 130 includes a rim protrusion 148. Rim protrusion 148 encircles the at least one protrusion 146. Rim protrusion 148 mates with a generally corresponding recess 123 in outer layer bottom surface 122b. The rim and the recess are contiguous and form and airless interface. Rim protrusion 148 frames the indicium for focus on the indicium and increases the surface area that the inner layer and outer layer are in contact.

The foregoing description of the specific embodiments so reveal the general nature of the invention that others can, by applying current knowledge, readily modify and/or adapt for various applications such specific embodiments without undue experimentation and without departing from the inventive concept, and, therefore, such adaptations and modifications should and are intended to be comprehended within the meaning and range of equivalents of the disclosed embodiments. The means and materials for caring out various disclosed functions may take a variety of alternative forms without departing from the spirit of the invention. It is to be understood that the phraseology or terminology employed herein is of the purpose of description and not of limitation.

What is claimed is:

1. A key for a key switch, comprising:
    an outer layer having an interior and a recess in the shape of a predetermined indicium;
    an inner layer having a protrusion in the shape of the predetermined indicium; wherein,
    the inner layer is located in the interior of the outer layer, the protrusion is located in the recess and contained entirely within the outer layer, and the protrusion is visible through the outer layer.

2. The key of claim 1, wherein the outer layer is transparent.

3. The key of claim 2, wherein the inner layer is colored.

4. The key of claim 1, wherein the outer layer is translucent.

5. The key of claim 4, wherein the outer layer is tinted.

6. The key of claim 5, wherein the inner layer is colored.

7. The key of claim 1, wherein the outer layer further comprises a dome portion.

8. The key of claim 7, wherein the dome portion is configured to magnify the protrusion.

9. The key of claim 8, wherein the dome portion is an exterior surface of the outer layer.

10. The key of claim 7, wherein the outer layer further comprises a first portion having a slope, and the dome portion is positioned on the first portion along the slope.

11. The key of claim 1, wherein the outer layer further comprises a generally elliptical portion.

12. The key of claim 11, wherein the outer layer further comprises a dome portion connected to the elliptical portion, and the recess is located in the dome portion.

13. The key of claim 12, wherein the elliptical portion has a slope and the dome portion is positioned along the slope.

14. The key of claim 1, wherein the inner layer comprises a first section connected to a second section, the second section including a pedestal having the protrusion located generally opposite the first section.

15. The key of claim 14, wherein the first section of the inner layer includes a web.

16. The key of claim 15, wherein the web comprises a plurality of webs.

17. The key of claim 14, wherein the protrusion of the inner layer is contiguous with the recess of the outer layer in an airless interface.

18. The key of claim 1, wherein the inner layer and the outer layer are made of substantially similar materials, and the inner layer and outer layer are cohesively connected.

19. A game controller, comprising:
    a casing having an opening; and,
    a key for a key switch positioned in the opening and including:
        an outer layer having an interior and a recess in the shape of a predetermined indicium;
        an inner layer having a protrusion in the shape of the predetermined indicium; wherein,
        the inner layer is located in the interior of the outer layer, the protrusion is located in the recess and contained entirely within the outer layer, and the protrusion is visible through the outer layer.

20. The game controller of claim 19, wherein the key comprises a plurality of keys.

21. The game controller of claim 20, wherein the plurality of keys include at least two keys of different colors.

22. The game controller of claim 20, wherein the plurality of keys include at least two keys of different sizes.

23. The game controller of claim 19, wherein the outer layer has a step, the opening has a periphery, and the step engages the periphery of the opening.

24. A game controller of claim 19, wherein the outer layer further comprises a dome portion, and the dome portion is tilted towards a center of the game controller.

25. The game controller of claim 19, wherein the outer layer is transparent and the inner case is colored.

26. The game controller of claim 19, wherein the outer layer is tinted and the inner layer is colored.

27. The game controller of claim 26, wherein the inner layer is opaque.

28. A pushbutton, comprising:
  a translucent outer portion having an inner surface, and
  an opaque inner portion contained substantially within the outer portion; wherein,
  the inner portion has a raised indicium, the inner surface of the outer portion includes a recess shaped complementary to and receiving the raised indicium.

29. The pushbutton of claim 28, wherein there is an airless interface between the inner and outer portions.

30. The pushbutton of claim 28, wherein the outer portion has an upper surface that is positioned at a tilted angle.

31. The pushbutton of claim 28, wherein the outer portion is tinted.

32. The pushbutton of claim 28, wherein the indicium is a letter or a numeral.

33. The pushbutton of claim 28, wherein the outer portion is colorless and the inner portion is colored.

34. The pushbutton of claim 28, wherein the inner portion has a raised rim around the raised indicium, and the inner surface of the outer portion includes a recess shaped complementary to and receiving the raised rim.

35. A game controller, comprising:
  a plurality electronic switches; wherein, at least one of the electronic switches includes a pushbutton; comprising:
  a translucent outer portion having an inner surface, and
  a opaque inner portion contained substantially within the outer portion; wherein,
  the inner portion has a raised indicium, the inner surface of the outer portion includes a recess shaped complementary to the raised indicium.

* * * * *

UNITED STATES PATENT AND TRADEMARK OFFICE
CERTIFICATE OF CORRECTION

PATENT NO.    : 6,498,311 B1
DATED         : December 24, 2002
INVENTOR(S)   : James R. Stewart et al.

It is certified that error appears in the above-identified patent and that said Letters Patent is hereby corrected as shown below:

Column 2,
Line 3, "II" has been replaced with -- 11 --.

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,498,311 B1
DATED : December 24, 2002
INVENTOR(S) : James R. Stewart et al.

It is certified that error appears in the above-identified patent and that said Letters Patent is hereby corrected as shown below:

<u>Title page,</u>
Item [54], Title, "KEYS" has been replaced with -- KEY --.

Signed and Sealed this

Twenty-third Day of September, 2003

JAMES E. ROGAN
*Director of the United States Patent and Trademark Office*